US006612827B1

(12) United States Patent
Minke et al.

(10) Patent No.: US 6,612,827 B1

(45) Date of Patent: Sep. 2, 2003

(54) APPARATUS FOR THE MANUFACTURE OF COMPACTS

(75) Inventors: Wolfram Minke, Wolfratshausen (DE); Rudolf Koch, Wackersberg (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/569,134

(22) Filed: May 11, 2000

(30) Foreign Application Priority Data

May 14, 1999 (DE) ........................................ 299 08 594

(51) Int. Cl.[7] ................................................ B29C 43/58

(52) U.S. Cl. ........................ 425/135; 425/145; 425/259; 425/261; 425/345

(58) Field of Search ................................. 425/135, 145, 425/150, 259, 260, 261, 345, 447

(56) References Cited

U.S. PATENT DOCUMENTS

| | | | | | |
|---|---|---|---|---|---|
| 4,108,338 | A | * | 8/1978 | Howland et al. | 425/353 |
| 5,352,112 | A | * | 10/1994 | Moore | 425/352 |
| 5,747,073 | A | * | 5/1998 | Pettersson et al. | 425/78 |
| 5,861,180 | A | * | 1/1999 | Kaneko et al. | 425/145 |
| 6,183,232 | B1 | * | 2/2001 | Bequette et al. | 425/78 |

* cited by examiner

*Primary Examiner*—Robert Davis
*Assistant Examiner*—Thu Khanh T. Nguyen
(74) *Attorney, Agent, or Firm*—Vidas, Arrett & Steinkraus

(57) ABSTRACT

An apparatus for the manufacture of compacts, preferably a tabletting machine, comprising a rotary cavity block table and a stationary filling shoe associated therewith for feeding the material used which is to be compacted in the cavity block, wherein the filling shoe is adjustable in height with respect to the surface of the rotary cavity block table via a servomotor.

2 Claims, 1 Drawing Sheet

*Fig.*
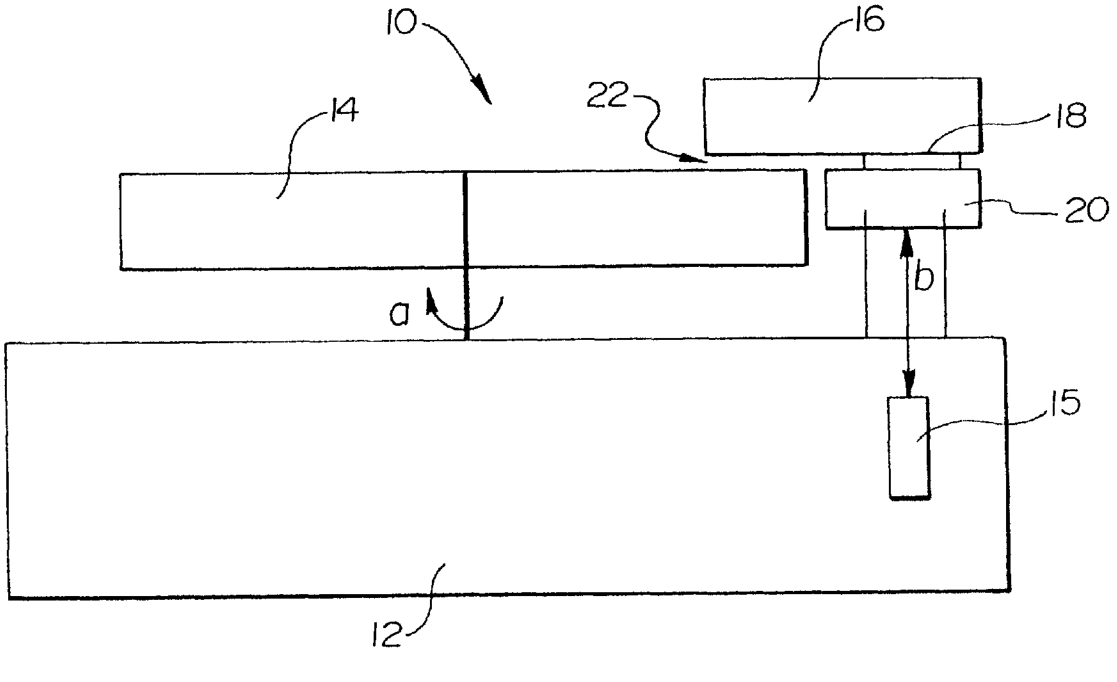

APPARATUS FOR THE MANUFACTURE OF COMPACTS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to an apparatus for the manufacture of compacts, preferably a tabletting machine.

When compacts of any types are manufactured and, specifically, when tablets are made the proportioning of the materials fed, i.e. the substance to be compacted, is of a particular significance, especially when high-performance presses are used. In the state of the art, such high-performance presses substantially comprise a rotary cavity block table and a stationary filling shoe associated therewith for feeding the material used which is to be compacted in the cavity block.

While accuracy of proportioning can be ensured by the use of modifiable stirring blade shoes even if performances are high the consequence of the charging principle, which is characterized by a combination of the stationary filling shoe above the rotary cavity block table, is that relatively large material losses have to be tolerated. As a rule, a sealing strip is provided between the filling shoe and the cavity block table. If the filling shoe is not exactly adjusted metallic abrasion might occur on the filling shoe sealing strips. Abraded metallic particles might migrate into the product to be manufactured, which causes the so-called black spots to form.

Attempts have been made in the past to overcome this problem by adjusting the distance between the filling shoe and the cavity block table as precisely as possible prior to putting them into operation. What matters here is the skillfulness of the person setting the machine in reducing the loss of material to an optimum extent while minimizing abrasion on the sealing strips at the same time. Once manufacture is under way it is no longer possible to carry out product-related corrections to the setting.

It is the object of the invention to remedy the aforementioned nuisance. In particular, further improvements are intended to be made to proportioning and the occurrence of black spots on the surface of the compact or tablet is intended to be minimized.

BRIEF SUMMARY OF THE INVENTION

According to the invention, an apparatus for the manufacture of compacts and, specifically, tablets provides that the filling shoe is supported so as to be adjustable in height with respect to the surface of the rotary cavity block table via a servomotor. This makes it possible to optimally adjust the distance between the filling shoe bottom plate and the cavity block table by an extremely precise adjustment, which may be in the range of some 100ths of a millimeter, to such a degree that the loss of material may be individually minimized depending on the composition and grain size of the material to be compacted with the distance, on the other hand, being selectable so that no abrasion will occur on the sealing strips and, therefore, the black spots requiring to be avoided will not form.

Accordingly, the bottom plate of the filling shoe may be mounted on a base which is adjustable in height via a motor disposed in the main frame of the machine. In addition, a measuring device may be provided via which the distance between the bottom plate of the filling shoe and the surface of the rotary cavity block table is measured. This permits to monitor the settings tailored to product quality, on one hand, and to acquire them in a reproducible manner, on the other. An output device for the values measured, in particular, may serve this purpose.

In order to ensure a constancy of the optimized gap distance, the gap width may also be ensured by means of a control circuit in which the gap with is adjustable as a controlled variable even if differences in height occur during the rotational motion of the rotary cavity block disk.

BRIEF DESCRIPTION OF THE SEVERAL VIEWS OF THE DRAWING

More details and advantages of the invention will be described with reference to an embodiment illustrated in the drawing. The single FIGURE shows a schematically drawn diagram of an embodiment of the present invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

The apparatus for the manufacture of tablets the construction of which is known per se is indicated by 10 in the figure. Because the construction of such a tablet press is known the detailed description of the structure of such an apparatus is dispensed with here. Only those components of apparatus 10 will be described which are necessary to comprehend the invention.

A rotary cavity block disk 14 is adapted to be set to a step-by-step rotation via a motor (not shown here) in the direction of the arrow a in a machine main frame 12. This step-by-step rotation causes a compacting chamber which is not shown in detail here to move to its receiving position for the reception of the feed material to be compacted. The receiving position is defined by a stationary filling shoe 16 through which the feed material to be compacted is filled in. A stirring blade type filling shoe which is known in the state of the art may be used, for example as a filling shoe.

The filling shoe 16 is mounted on a base 20 via its bottom plate 18 such as to be positioned with respect to the rotary cavity block disk 14 as shown in the figure. When in this partially overlapping position a gap 22 will arise the width of which is dependent upon the distance between the underside of bottom plate 18 of filling shoe 16 and the surface of the rotary cavity block disks 14. For an adjustment of gap 22, base 20 is adapted to be adjusted in the direction of the dual arrow b via a high-precision servomotor 24. At this point, the rotational motion of motor 15 may be transmitted to rotary cavity block disk 14 by means of any gearing. However, motor 15 and the gearing have been designed so that the width of gap 22 can be adjusted to some 100ths of a millimeter.

The width of gap 22 may be measured here by means of a measuring device in a manner not shown in detail in the figure and may be plotted as a diagram by means of an output device. This makes it possible to reproducibly acquire each of the settings in an optimized way. Instead of plotting the settings diagrammatically they may also be stored in an electronic memory.

Moreover, the width of gap 22 may also serve as a controlled variable of a control circuit. This permits to adjust an optimum distance between filling shoe 16 and cavity block disk 14 which is based on empirical values for certain feed materials to be compacted in a machine the construction of which is known per se.

The application of the inventive apparatus is not limited to compacting tablets, but may also cover pressing any compacts in compressing devices of such a type.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An apparatus for the manufacture of compacts comprising a rotary cavity block table having a top surface and a filling shoe above the rotary cavity block, the filling shoe having a bottom plate which forms a gap between the surface of the table and the bottom plate, characterized in that the bottom plate of the filling shoe is mounted on a base which is adjustable in height via a motor disposed in a main range of the machine, a distance measuring device being provided which measures the gap distance between the bottom plate and the top surface of the rotary cavity block table, and a control circuit being provided to control the gap in order to minimize the degree of material losses and of abrasion of a sealing strip by the rotary cavity block table.

2. The apparatus according to claim 1, characterized in that the gap distance values measured via the distance measuring device are adapted to be displayed via an output device.

* * * * *